Figure 1:
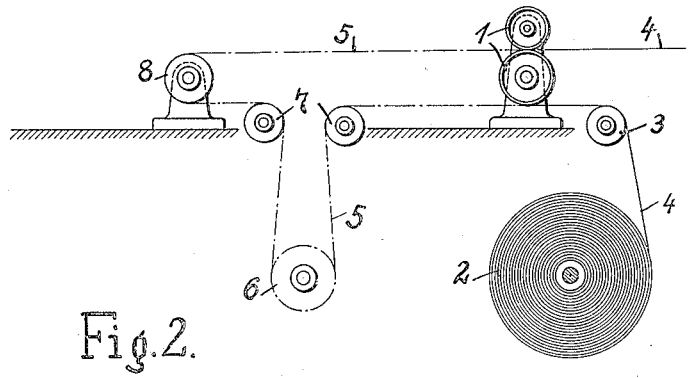

April 1, 1924.

G. SPIESS 1,489,167

PRODUCING INTERMITTENT MOVEMENT OF WEBS

Filed Nov. 18, 1922  3 Sheets-Sheet 1

Inventor:
Georg Spiess
by [signature]
Attorney.

April 1, 1924.                                                1,489,167
G. SPIESS
PRODUCING INTERMITTENT MOVEMENT OF WEBS
Filed Nov. 18, 1922            3 Sheets-Sheet 2
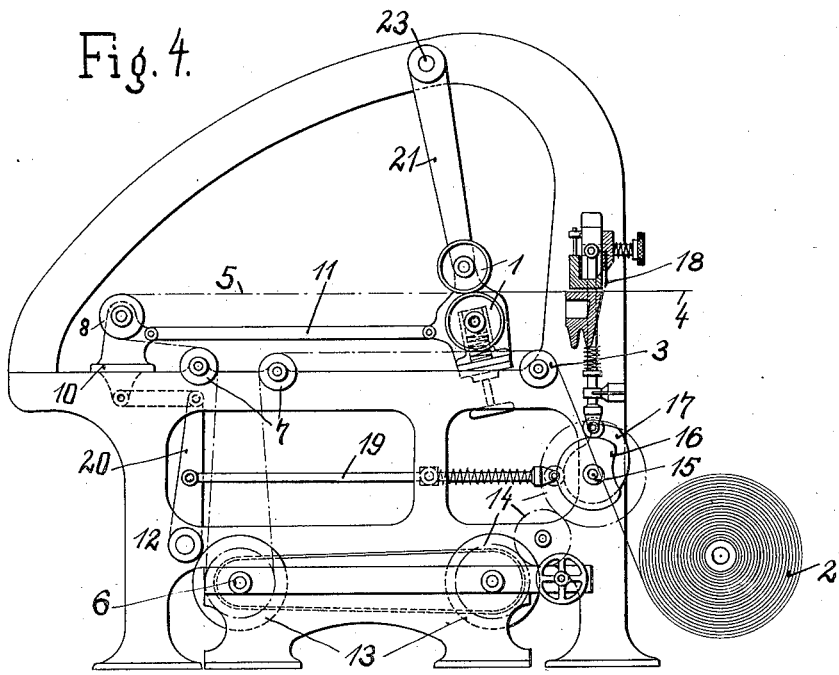
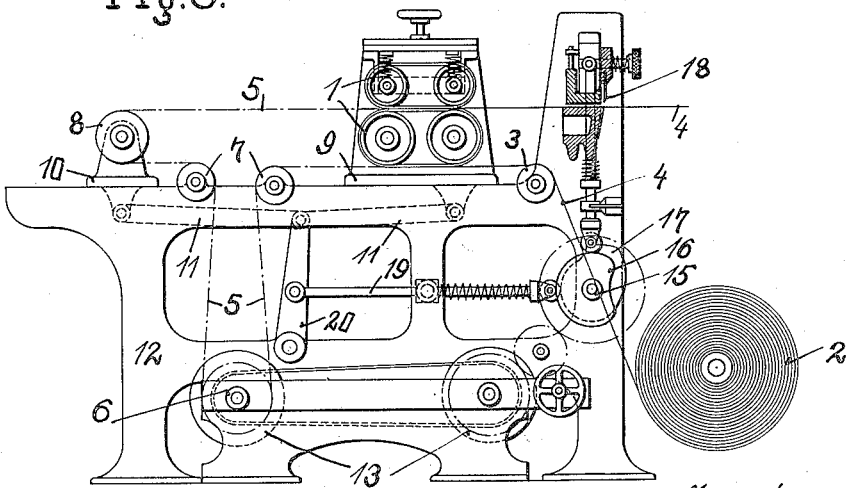
Inventor:
Georg Spiess Patented Apr. 1, 1924.

1,489,167

UNITED STATES PATENT OFFICE.

GEORG SPIESS, OF LEIPZIG-REUDNITZ, GERMANY.

PRODUCING INTERMITTENT MOVEMENT OF WEBS.

Application filed November 18, 1922. Serial No. 601,923.

*To all whom it may concern:*

Be it known that I, GEORG SPIESS, a citizen of Germany, residing at Leipzig-Reudnitz, Germany, have invented certain new and useful Improvements in Producing Intermittent Movement of Webs, of which the following is a specification.

This invention has reference to means of producing an intermittent movement in continuously fed webs or strips of material, and among other uses it applies to the manufacture of paper, of fabrics, and the feeding and treating of webs or strips of material the feeding of the web has to be stopped at certain times, thus for example in the case of transverse cutters with shearing cut during the cutting operation, or, in the case of printing, stamping, and stenciling machines with reciprocating tool during the course of operation. With these and other kinds of machinery it is best to avoid interruptions in the feeding of the web, so as to avoid irregular, and jerking movements, and to prevent objectionable tensional strains in the web of material by the sudden pulling and subsequent breaking of the same; and with the continuous feeding of the web to the feeding rollers and the intermittent feeding movements of the latter an excess of feeding material is temporarily produced in front of the feeding rollers which has to be taken up and compensated in some way, so as to prevent accumulation and stacking up of the material and to maintain uniform tension in the web. This effect is frequently produced in the art by rockingly mounted rollers or the like. In machinery of this kind the intermittent feeding movement is produced by employing for example draw beam presses or intermittently operating rollers moved by crank drive or the like. In such driving mechanism however, perfect rest exists only for a very short period of time; while this inoperative period may be somewhat lengthened by making use of slowing down gears or elliptical wheels, the stoppage of the length of the web of material required in accordance with the operating procedure under consideration cannot be accomplished. By means of the continuously great variations in the velocity of the feeding means the ratio between the same and the web of material is constantly changed so that the tension in said web of material varies continuously and the material is most unfavorably influenced.

In accordance with the means provided by my invention these inconveniences are avoided, and with this end in view my invention provides means of effecting a reverse movement of the feeding means for the material approximately or exactly opposed to the feeding movement and by this means that part of the web of material which has already passed through the feeding means, is influenced according to the velocity of the feeding movement and the peripheral speed of the feeding means, so as to produce in the portion referred to of the material either a reduction of the speed, or an entire stoppage or a retrograde movement of the web.

Figure 2:
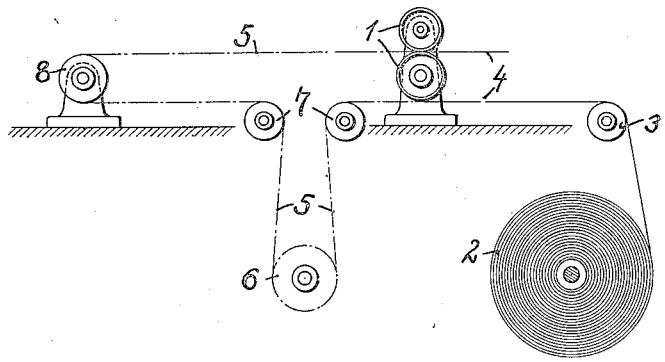

The invention will be more fully described with reference to the accompanying drawings on which a device is shown by way of example for the carrying out of the method embodying the principles of my invention in Figures 1 and 2 in diagrammatic views, while Figures 3 to 7 illustrate a transverse cutter with shearing cut as further examples of the invention.

In the diagram 1 represents a pair of feed rollers which in the construction submitted serves at the same time as delivery rollers. The paper roller 2 is mounted to the rear of the pair of rollers 1, so that the web of paper 4 is to be guided over a guide roller 3, and forms a loop around one of the rollers of the pair of rollers 1. The said rollers 1 are moved by means of a belt 5 from a disc 6 which latter in the following specification will be assumed to be continuously rotated with uniform velocity for the sake of clearness of illustration without restricting the invention to this manner of operation. The belt 5 is guided over guide rollers 7 and a disc 8. The pair of rollers 1 and the disc 8 are so arranged that they allow of being displaced during feeding movement of the web. This bodily movement of the rollers may be rectilinear or in a curved path. Upon the stopping of the body movement of the pair of rollers 1 and of the disc 8 the part of the web of paper to the rear of the pair of rollers 1 has the same velocity as the part in front of said rollers 1 (Figure 1). If the web 4 to the rear of the rollers 1 is to be stopped the pair of rollers 1 and the disc 8 are moved to the left (Figure 2) with a velocity equal to half the speed of delivery. During this movement the upper leg of the belt 5 is held stationary, while the lower leg retains its former speed, and in consequence thereof the actuating speed of the pair of rollers 1 is also changed, and is reduced to half its amount. It is evident, therefore, that the speed of delivery of the web between the roll 2 and the feed rollers 1 remains the same during the movement of the pair of rollers and during their stoppage. The extent of the movement of the pair of rollers 1 and of the disc 8 is dependent upon the length of time during which the part of the web of material already fed by the rollers 1 is to be held stationary. If the web is to be fed again the pair of rollers 1 and the disc 8 are returned to their initial positions with the same velocity. As a result of the relative movement of the parts the peripheral speed of the disc 8 and of the pair of rollers 1 is equal to one and a half times the speed of delivery of the web 5, so as to make the feeding velocity of the portion of the web to the rear of the pair of rollers 1 equal to twice the speed of delivery. Hence, in this case likewise there is no change in the amount of web fed, so as to prevent any excess of material to become accumulated during the return or the forward movement of the pair of rollers. The transition of the pair of rollers from their position of rest (Figure 1) into the movement, and the reversing of this movement are of course taking place without jerk, and gradually. The feeding speed of the web 4 to the rear of the pair of rollers 1 is therefore gradually reduced from its normal value to zero, it then rises to a maximum, and in the concluding step it reassumes its normal value. In the example hereintofore described it has been assumed merely for the case of clearness of illustration that the web of material will be entirely at rest to the rear of the pair of rollers. By correspondingly adjusting the movement of the pair of rollers 1 and of the disc 8 which is opposed to the delivery feeding direction, and by correspondingly arranging the peripheral speed of the pair of rollers 1 it is possible to obtain any desired degree of retardation of movement of the web 5 to the rear of the pair of rollers 1, and even a retrograde movement of the web, the velocity in the case first referred to being less than half the delivery speed while in the second case it would have to be larger.

In the diagram and the explanation thereof it has been assumed for the sake of simplicity that the reciprocating pair of rollers 1 is also operative to effect the delivery of the web from the roller 2; but this arrangement is not necessarily employed in all cases. Thus for instance, in the case of machines in which the web of material is to be submitted to a plurality of operating stages the first part of which requires a uniformly moving web of material, while in the other operating stages the web is to be kept stationary, the delivery of the feeding of the web is to be effected for example by a special pair of rollers, or by other additional means.

Figure 3:
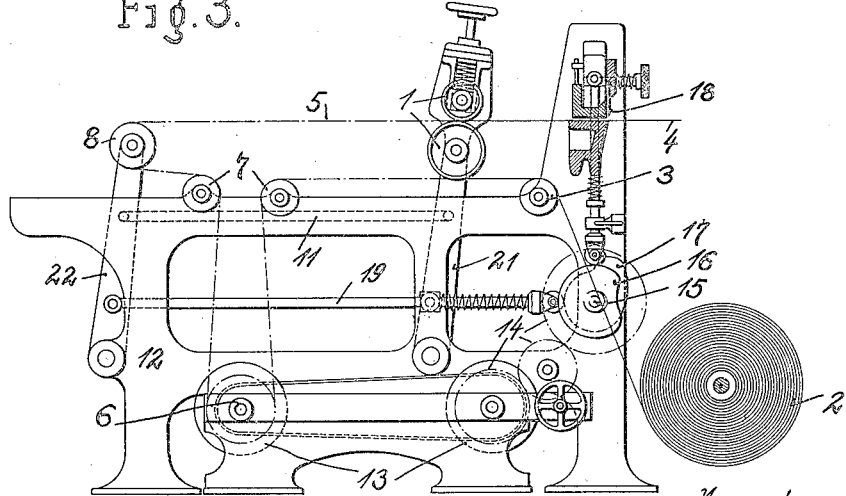
Figure 6:
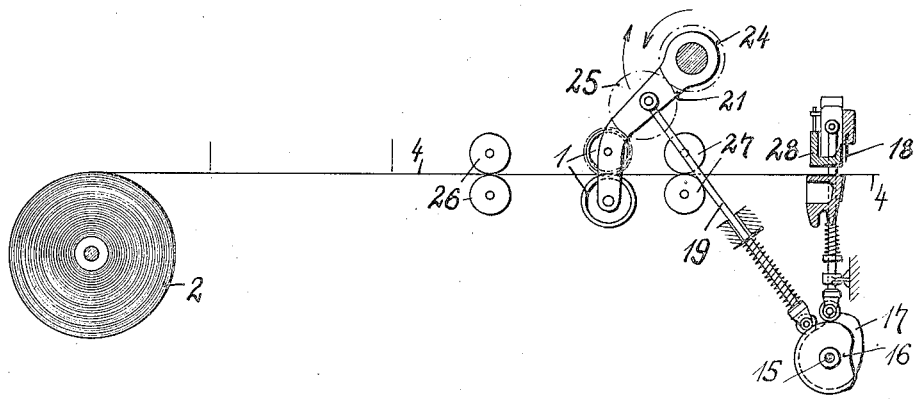
Figure 7:
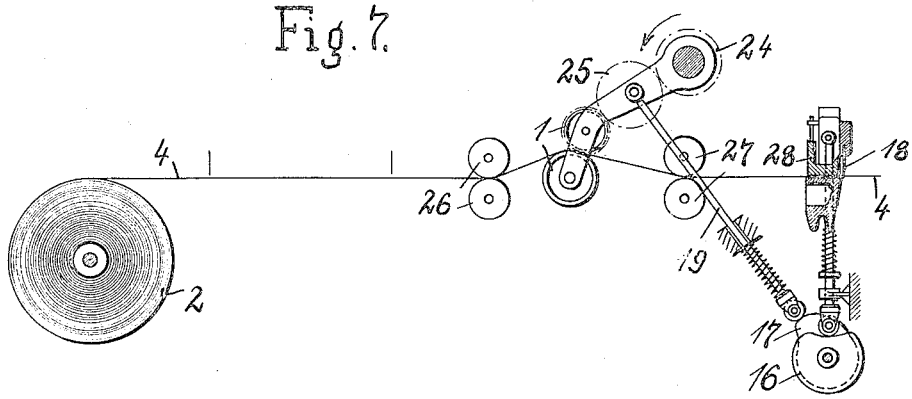

In Figures 3, 4, 5 of the drawing transverse cutters with shearing cut are shown by way of example in which the method of procedure hereintofore explained is employed. The devise used in the structure according to Figure 5 corresponds to the disclosure of Figures 1 and 2 with the exception that in place of a pair of rollers for effecting the movement of the endless apron are mounted in a carriage 9, while the tensioning roller 8 is mounted in a carriage 10, the two carriages being connected to each other by a framing 11 and being horizontally displaceable in the machine frame 12. The displacement of the tensioning roller 8 may also be effected in other direction than in the horizontal plane, this being determined merely by the guiding of the belt 5. From the main driving shaft 6 of the transverse cutter the pair of rollers 1 is moved by the belt guided on the guide rollers 7 and the tensioning roller 8, and, on the other hand, by means of a belt operated double bevel pulley 13, and a train of gearing 14 a shaft 15 is operated upon which two cam discs 16, 17 are mounted. One of these cams 16 serves for the actuation of the upper knife 18, and the second cam 17 causes the displacement of the carriages 9 and 10 by means of the system of levers 19, 20 operating upon the bar 11 which connects the two carriages 9, 10. The two cam discs 16, 17 are arranged in such relation to each other that the displacement of the carriages 9, 10 approximately or exactly coincides with the vertical reciprocation of the upper knife 18. In this machine the size of the sheet to be cut is regulated by changing the speed of the shaft 15' by means of the belt operated double bevel pulley 13 referred to. In view of the change of speed of this shaft in accordance with the size of the sheet the velocity of movement of the carriages 9, 10 would vary according to the size of the sheets by using one and the same cam disc 16. In order to avoid this difficulty an adjustable cam disc is preferrably employed.

It has already been stated above that the movement of the pair of rollers 1 and of the tensioning roller 8 need not be exactly rectilinear, but it may also be effected in a curved path. The last mentioned form of movement presents the advantage of more favorable conditions of movement, and that the masses may be more easily set in motion in consequence of the operation of lever arms. A form of construction of transverse cutter embodying these principles is shown by way of example in Figure 3. In this structure the pair of rollers 1 and the tensioning roller 8 are mounted upon levers 21, 22 which with their lower ends are rotatably mounted in the frame 12 of the machine. These levers are also influenced from the cam disc 17 by a system of levers 19 in such a manner as to allow them with the rollers 1 and the tensioning roller 8 to swing at the proper time.

Figure 4 shows a combination of the two structures hereinbefore described. In this construction the pair of rollers 1 is mounted upon a rockable lever 21, while the tensioning roller 8 is mounted upon the rectilinearly moved carriage 10. In this form of construction the lever 21 is pivotally secured at a point 23 of the machine frame above the pair of rollers 1. The lever may be arranged in such a manner as to allow it to swing to either side from the vertical position, as shown in Figure 4; or the arrangement may be such that the lever can swing to one side only. The latter arrangement has the advantage that the lever with the pair of rollers is returned to its initial position by its own weight, and that in this position the system of operating levers is balanced.

In the transverse cutters described the paper roller 2 is mounted at the rear of the machine, so that half of the web of paper is passed around one of the feeding rollers, and a loop is formed in the web. This arrangement, however, is not always possible, for instance in case the web has to pass through an observation member in front of the pair of rollers or has to be printed upon. In this case the paper roller has to be mounted in front of the transverse cutter, and the web is conducted in a straight path through the feeding rollers. If in this arrangement the web of paper is to be held stationary at the rear of the pair of rollers by the movement of the pair of feeding rollers, the said rollers should be moved backwards with twice the velocity and through twice the distance as in the forms of construction heretofore described. This causes very considerable difficulties, however, on account of the resulting great length of the machine, and the acceleration of the masses. The acceleration is of particularly great importance, because the new method is to be applied to rapidly moving machines with great efficiency and large output. In the forms of construction already described the change of speed, of the portion of the web 4 to the rear of the pair of rollers 1 is not effected suddenly and jerkingly, but gradually, as already mentioned. The greater the velocity of movement of the pair of rollers, the more time will, of course, be required for the transition from one speed to the other. This period of time must, however, be kept within certain limits in consideration of the other operating stages, and in view of all these circumstances, it is desirable to somewhat modify the way of procedure in the case of machines in which the paper roller is mounted in front of the machine. In this case I prefer to use a combination of the new way of procedure with that heretofore employed, as appears from Figures 6 and 7 of the drawings. In this modification the pair of rollers 1 is likewise mounted upon a lever 21 which is rockingly suspended from a point above the rollers. Upon the same shaft with the lever 21 a gear wheel 24 is mounted which operates the rollers 1, by means of an intermediary wheel 25 secured to the lever, with uniform velocity, as may be assumed for the sake of simplicity of explanation. In front and to the rear of the pair of feeding rollers 1 pairs of guide rollers designated 26 and 27 respectively are arranged for the web of paper 4. The pair of rollers 1 draws off the web of paper with uniform speed from the paper roller 2, and feeds it at a uniform rate and in the forward direction towards the knife 18, when the feeding rollers are in the normal position. Some time before the cut is effected the lever 21 is rocked back with the pair of rollers, and in a direction opposite to the direction of rotation of the gear wheel 24 so as to increase the peripheral speed of the pair of rollers 1. Upon the rocking backwards of the lever the pair of rollers 1 extends the web of paper again into a loop between the pairs of guide rollers 26, 27, which causes a retardation of movement of the part of the web of paper to the rear of the pair of rollers 1. After the lever has been swung back for a certain distance the pressing bar 28 in front of the knife is depressed upon the web of paper, so as to cause the movement of the part of the web in advance of the pressing bar 28 to be interrupted. The engagement of the pressing bar with the web of paper is effected at a time at which the velocity of the web has been so much decreased by the swinging back of the pair of rollers 1 that the sudden interruption of movement of the web of paper cannot produce excessive tensions in the same. The velocity of the swinging back movement and the amplitude of the lever, and the peripheral speed of the pair of rollers during this time are so adjusted that the web of paper is continued to be uniformly drawn off and delivered, and on the other hand the excess of paper in front of the pressing bar 28 is extended into a loop or bight by positive movement, and without changing the tension of the web. By means of this cooperation of the pressing bar with the rocking pair of delivery rollers the advantage is obtained, as compared with transverse cutters operating with pressing bars only of keeping the web of paper immovable for a sufficiently long time, and the inconvenience is avoided of having to move the lever with the pair of rollers backwards with an objectionably high velocity and over an objectionably large distance.

The invention is not restricted to the particular arrangement and construction of parts shown in the structural embodiments described and illustrated by way of example, but various modifications and alterations both in the individual parts as well as in their relative arrangement may be effected in accordance with the requirements of different uses of the invention, and within the scope of the appended claim.

I claim:

The method of changing the travel of webs of material while feeding continuously from a source of supply which consists in passing the web through feed rollers and bodily displacing the feed rollers with relation to the direction of feed and at a rate equal to the rate of normal travel of the web.

In testimony whereof I affix my signature.

GEORG SPIESS.